Nov. 22, 1938.   R. D. SHAW   2,137,358
CHIP BREAKER
Filed Sept. 22, 1936
Fig. 1
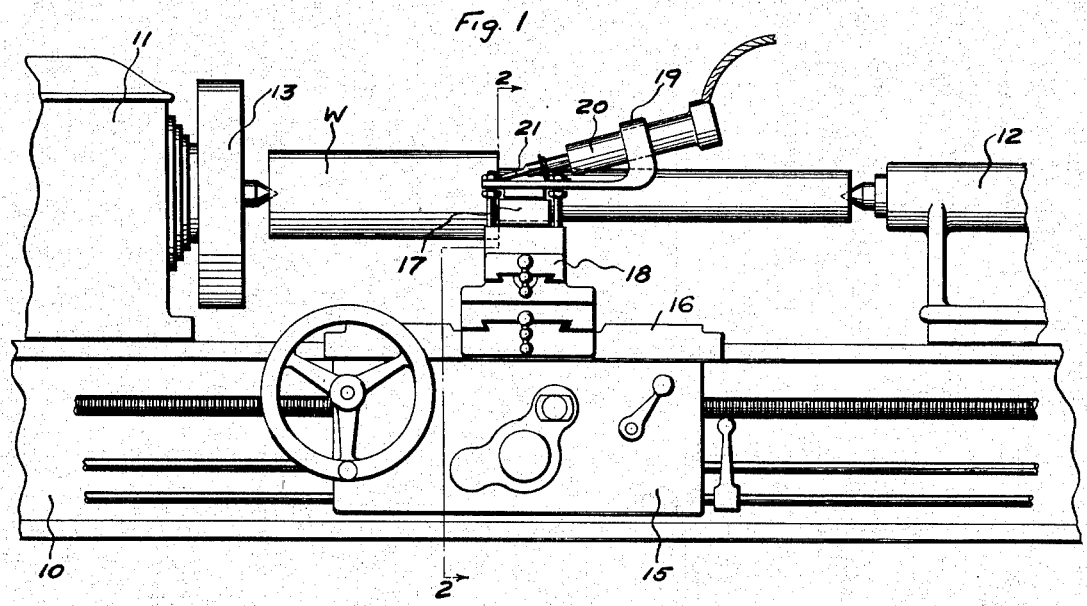
Fig. 2
Fig. 3
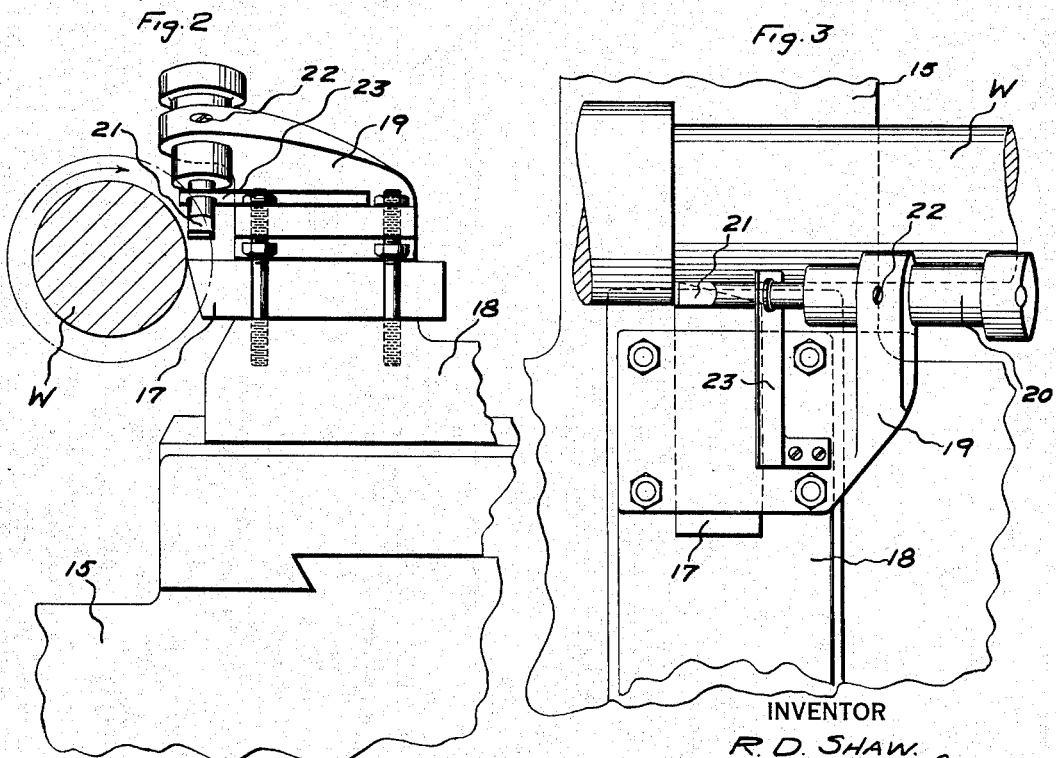
INVENTOR
R. D. SHAW.
BY Joseph N. Schofield
ATTORNEY Patented Nov. 22, 1938

2,137,358

UNITED STATES PATENT OFFICE 2,137,358

CHIP BREAKER

Robert D. Shaw, Hartford, Conn., assignor to Niles-Bement-Pond Company, Hartford, Conn., a corporation of New Jersey Application September 22, 1936, Serial No. 101,972

3 Claims. (Cl. 82—34)

This invention relates to chip breaking means for application to metal cutting machines such as engine lathes and the like in which a cutting tool is moved longitudinally along the work as the work is being rotated.

A primary object of the present invention is to provide a striker in the form of a chisel edged tool positioned to engage the face of the work being cut along substantially a radial line in advance of the cutting tool to periodically indent or nick this face of the work piece so that the chips formed by the cutting tool will break successively at the nicked or indented points and prevent an elongated chip being formed to completely wrap itself about the work piece.

Another object of the invention is to provide rapidly actuating means to reciprocate the chisel striking tool so that the cutting edge of the striker may be forced against the cutting surface of the work piece at closely adjacent points during rotation of the work.

And finally it is an object of the invention to provide pneumatically operated means such as an air operated percussive hammer to strike the chisel against the face of the work with a rapid succession of relatively heavy blows sufficient to weaken the metal along the line engaged by the chisel edge.

With the above and other objects in view, the invention may include the features of construction and operation set forth in the following specification and illustrated in the accompanying drawing.

In the accompanying drawing annexed hereto and forming a part of this specification, I have shown my invention applied to the tool support of a large size engine lathe but it will be understood that the invention can be otherwise embodied and that the drawing is not to be construed as defining or limiting the scope of the invention, and claims appended to this specification being relied upon for that purpose.

In the drawing:

Figure 1 is a fragmentary front elevation of an engine lathe to which the present invention has been applied.

Fig. 2 is a cross sectional view of the machine taken substantially upon the plane of line 2—2 of Fig. 1 and looking in the direction of the arrows, and Fig. 3 is a fragmentary plan view showing the cutting tool and indenting tool in relation to a work piece being cut.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a base having work supporting and rotating means thereon; second, a tool supporting carriage and cross slide on which may be mounted a cutting tool movable in directions longitudinally and radially of the work; third, a support preferably mounted on and movable with the cross slide immediately above the cutting tool and having a pneumatic hammer or other actuating means adjustably secured thereon; fourth, a chisel edged cutting or indenting tool actuated by the pneumatic hammer and positioned to strike against the cutting face of the work being turned at closely adjacent points and in advance of the cutting tool; and fifth, resilient means normally retaining the indenting tool away from the cutting face of the work piece being turned but permitting movement thereof into cutting engagement with the work.

Referring more in detail to the figures of the drawing, I provide a base 10 having a headstock 11 at one end thereof and an adjustably mounted tailstock 12 adjacent its opposite end. Within the headstock 11 is provided the usual work supporting and rotating means 13 so that the work W being turned may be rotated upon a fixed axis and at any desired speed.

Movable along the base 10 is a tool supporting carriage 15 having a cross slide 16 thereon. The carriage 15 is movable longitudinally along suitable ways of the base 10 and the cross slide 16 is movable in a horizontal plane and normally to the direction of movement of the carriage 15. On the cross slide 16 is mounted a cutting tool 17, the tool head 18 within which it is supported having suitable clamping means for rigidly securing the tool 17 in any adjusted position. Also mounted on the tool supporting head 18 is a bracket 19 within which the actuating means 20 for the chip breaking tool 21 may be adjustably supported. This chip breaking tool 21 has a chisel edge at one end positioned to strike against the surface of the work piece W being cut along substantially a radial line. The opposite end of the tool 21 enters the cylinder or body member of a pneumatic hammer 20. This chip breaking tool may be actuated by and the drawing shows a pneumatic hammer of conventional form, the cylinder of which may be adjustably mounted within the bracket 19 in a manner to retain the tool 21 in position for striking against the cutting surface of the work piece. By means of a screw 22 threaded within the bracket 19 the hammer 20 may be longitudinally adjusted and then clamped to properly position the tool 21 for striking the cutting surface of the work W in advance of the cutting tool.

Also secured on the tool head 18 is a retracting member shown in the form of a long flexible strip of metal forming a spring 23 or other resilient member preferably having an opening through which the chip breaking or indenting tool 21 passes and against which a shoulder on the tool may engage. By means of this spring or other resilient connection 23 the chisel or indenting tool 21 is normally retained slightly from the cutting surface of the work piece W but in a manner permitting the chisel edge of the tool to strike against a face thereof and force the chisel edge to nick or indent the cutting surface of the work piece sufficiently to materially weaken the metal along the lines indented.

In operation the tool 17 is advanced in the usual manner and the air or other motor power applied to the actuating cylinder 20 of the percussive hammer or chisel so that this chisel 21 is forced repeatedly into contact with the cutting surface of the work W. During rotation of the work piece a plurality of substantially equally spaced indentations are formed in the cutting face of the work piece immediately prior to the cutting action of the tool upon the surface of the work piece. By reason of these indentations effected by the chisel edge of the chip breaker, weakened sections of the metal are produced at closely adjacent positions, these weakened sections being sufficient when cut by the tool 17 to cause breakage of the metal along the lines of these indentations into chips the lengths of which equal the distance between successive indentations of the indenting tool into the cutting face of the work piece. Preferably the chisel edge of the tool 21 is sufficiently long to indent the surface of the work cut by the tool 17 substantially the full depth of the cut made by the tool.

What I claim is:

1. A chip breaker for metal cutting machines comprising in combination, a cutting tool, a tool support therefor movable to advance the tool during the cutting operation, a striker mounted for movement with said tool and having a cutting edge positioned to engage the work being cut in advance of the tool, and hammer actuated means to force the cutting edge of the striker percussively into the surface of the work being cut, said means supporting said striker and normally retaining said striker slightly retracted from the surface of the work being cut.

2. A chip breaker for metal cutting machines comprising in combination, a cutting tool, a tool support therefor movable to advance the tool during the cutting operation, a hammer actuated striker mounted for longitudinal movement with said tool and having a straight cutting edge positioned to engage the surface of the work engaged by the tool substantially radially and in advance of the tool, and means to rapidly force the striker percussively into the surface of the work cut by the tool, said means normally supporting and retaining said striker slightly retracted from the metal being cut.

3. A chip breaker for metal cutting machines comprising in combination, a cutting tool, a tool support therefor movable to advance the tool during the cutting operation, a hammer actuated striker mounted for longitudinal movement with said tool and having a cutting edge positioned to engage the work in advance of the tool, pneumatically actuated hammer means to rapidly force the striker percussively against the surface of the work engaged by the tool, and means normally retaining said striker slightly retracted from the metal being cut.

ROBERT D. SHAW.